(12) United States Patent
Brünnemann

(10) Patent No.: US 6,609,040 B1
(45) Date of Patent: Aug. 19, 2003

(54) METHOD OF ANALYZING AND OPTIMIZING A MULTISTAGE MANUFACTURING PROCESS

(75) Inventor: Michael Brünnemann, Münster (DE)

(73) Assignee: BASF Coatings AG, Muenster-Hiltrup (DE)

( * ) Notice: Subject to any disclaimer, the term of this patent is extended or adjusted under 35 U.S.C. 154(b) by 216 days.

(21) Appl. No.: 09/690,030

(22) Filed: Oct. 16, 2000

(30) Foreign Application Priority Data

Oct. 16, 1999 (DE) .......................................... 199 49 954

(51) Int. Cl.⁷ .......................... G06F 19/00; G05B 13/02
(52) U.S. Cl. .......................... 700/108; 700/28; 700/37; 700/109
(58) Field of Search .............................. 700/28, 32, 37, 700/95, 97, 108, 109, 266

(56) References Cited

U.S. PATENT DOCUMENTS

| | | | | |
|---|---|---|---|---|
| 5,710,700 A | * | 1/1998 | Kurtzberg et al. | 700/108 |
| 5,956,692 A | * | 9/1999 | Foley | 700/108 |
| 6,122,555 A | * | 9/2000 | Lu | 700/28 |
| 6,128,542 A | * | 10/2000 | Kristoff et al. | 700/121 |
| 6,223,094 B1 | * | 4/2001 | Muehleck et al. | 700/107 |
| 6,317,643 B1 | * | 11/2001 | Dmochowski | 700/100 |
| 6,330,487 B1 | * | 12/2001 | Jahn et al. | 118/696 |
| 6,442,513 B1 | * | 8/2002 | Cheng et al. | 703/12 |
| 6,445,962 B1 | * | 9/2002 | Blevins et al. | 700/37 |

* cited by examiner

Primary Examiner—Leo Picard
Assistant Examiner—Elliot Frank
(74) Attorney, Agent, or Firm—Mary E. Golota

(57) ABSTRACT

Method of analyzing and optimizing a multistage manufacturing process which includes a number of standard steps that are carried out identically and which are followed by tuning steps that are carried out in order to achieve predefined product properties, their type, number and exit being variable. The individual steps relate to at least one production-specific property an are recorded quantitatively in an electronic database. The property can be, for example, a proportion of the quantities, a proportion of the costs, or the effects of an individual step on a product property to be achieved. Examples of a multistage manufacturing process are the manufacture of a coating from a plurality of individual components and additives. With the aid of the information compiled in a database, individual steps can be reduced in terms of their number and their extent.

9 Claims, 4 Drawing Sheets

Fig-1

| Tabelle 1 | Zahlenwerte: Zugegebener Anteil in Gew.% bezogen auf Normalstuckliste | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| | B1 | B2 | B3 | B4 | B5 | B6 | B7 | B8 | B9 | B10 | B11 | B12 | B13 | B14 | B15 | B16 | B17 | B18 | B19 | B20 | B21 | B22 | B23 | B24 | B25 | B26 | B27 | B28 | B29 | B30 | B31 |
| FTGZ1 | | | | | | | | | | | | | 0,03 | | | | | | | | | | | | | | | 0,03 | 0,21 | 0,03 | 0,02 |
| FTGZ2 | | | | | | | | | | | | | 0,03 | 0,07 | | | | | 0,02 | | | | | | 0,02 | 0,01 | | | | | |
| FTGZ3 | | | | | 0,03 | | | | | | 0,02 | 0,02 | | | | 0,09 | 0,06 | 0,09 | | 0,11 | 0,15 | 0,13 | 0,13 | 0,10 | 0,10 | 0,09 | 0,04 | 0,06 | 0,03 | 0,34 | 0,05 | 0,02 |
| FTGZ4 | | | | | | | | | | | | 0,04 | | | | | | | | | | | | | | | | | | | |
| FTGZ5 | | | | | | | | | | | | | | 0,02 | | | | | | | | | | | | | | | | | |
| FTGZ6 | | 0,05 | 0,06 | 0,04 | | | | 0,03 | | 0,04 | | | | | 0,05 | | | | | | | | | | | | | | | | |
| FTGZ7 | 0,12 | 0,14 | 0,12 | 0,17 | 0,09 | 0,16 | 0,12 | 0,08 | 0,07 | 0,08 | 0,04 | 0,10 | | | | | | | | | | | | | | | | | | | |
| FTGZ8 | | | | | | 0,05 | | | | | 0,15 | 0,30 | | | 0,20 | 0,30 | | | | | | | | | | | | | | | | |
| FTGZ9 | | | | | | | | | | | | 0,12 | | | | | 0,02 | | | 0,02 | | | | | | | | | | | | |
| FTGZ10 | | | | | | | | | | | 1,95 | 1,49 | | 2,37 | 2,34 | | | | | | | | | | | | | | | | | |
| FTGZ11 | 0,16 | 0,19 | 0,14 | 0,50 | 0,31 | 0,63 | 0,26 | 0,19 | | | 0,19 | 0,28 | 0,17 | 0,07 | 0,23 | | | | | 0,47 | | | | | | | | | | | | |
| FTGZ12 | 0,03 | | 0,29 | 0,18 | 1,19 | 1,26 | 0,46 | 0,41 | 0,25 | 0,53 | 1,77 | 2,28 | 0,50 | 3,23 | 0,84 | 0,27 | | | | | | | 0,33 | 0,16 | 0,13 | | 0,51 | | 0,53 | | |
| FTGZ13 | | | | | | | | | | 0,03 | | | | | | | | | | | | | | | | | | | 0,93 | | |
| FTGZ15 | 0,08 | 0,06 | | 0,16 | 0,43 | 0,03 | 0,16 | 0,11 | 0,06 | 0,13 | 1,37 | 0,56 | 0,22 | 1,84 | 1,05 | | | | | | | | | 0,01 | | | 0,04 | | | | |
| FTGZ16 | | 0,05 | | 0,08 | | 0,49 | | 0,04 | 0,19 | 0,04 | 0,71 | 0,50 | | | 1,05 | | | | | | | | | | | | | | | | |
| FTGZ17 | | | | | | | | | | | 1,00 | | | | | | | | | | | | | | | | | | | | |

Fig-2A

| Tabelle 2 | Zahlenwerte: Anzahl der Einzelzuwaagen pro Batch | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| | B1 | B2 | B3 | B4 | B5 | B6 | B7 | B8 | B9 | B10 | B11 | B12 | B13 | B14 | B15 | B16 | B17 | B18 | B19 | B20 | B21 | B22 | B23 | B24 | B25 | B26 | B27 | B28 | B29 | B30 | B31 |
| FTGZ1 | | | | | | | | | | | | | | 1 | | | | | | | | | | | | | | | | | |
| FTGZ2 | | | | | | | | | | | | | | 1 | 2 | | | | 2 | | | | | | | | | 2 | 1 | 2 | 1 |
| FTGZ3 | | | | | 1 | | | | | | | | | | | 1 | 3 | 1 | 2 | 3 | 2 | | 3 | 3 | 1 | 2 | 2 | 1 | 3 | 2 | 1 |
| FTGZ4 | | | | | | | | | | | | | | | | | | | | | | | | | | 1 | | | | | |
| FTGZ5 | | | | | | | | | | | | | | 1 | | | | | | | | | | | | | | | | | |
| FTGZ6 | | 2 | 2 | 2 | | | | 1 | | 2 | | | | | 2 | | | | | | | | | | | | | | | | |
| FTGZ7 | 2 | 2 | 2 | | 2 | 3 | 3 | 2 | 2 | 3 | 1 | 1 | 2 | | | | | | | | | | | | | | | | | | |
| FTGZ8 | | | | | | 1 | | | | | 1 | 2 | | 2 | 6 | | | | | | | | | | | | | | | | |
| FTGZ9 | | | | | | | | | | | 3 | 5 | | 3 | 4 | | | | | 2 | | | | 1 | | | | | | | |
| FTGZ10 | | 3 | 2 | 5 | 4 | 5 | 5 | 3 | | | 9 | 1 | 1 | 1 | | | | | | | | | | 1 | | | | | | | |
| FTGZ11 | 2 | | | 4 | 6 | 5 | 4 | 4 | 2 | 4 | 1 | 5 | 3 | 4 | 1 | 1 | | 1 | | | | | 2 | 2 | | | 1 | | | | |
| FTGZ12 | 1 | | | | 8 | 1 | 3 | 2 | 2 | 1 | 6 | | 2 | 3 | 4 | | | | | | | | | | 1 | 3 | | | | | |
| FTGZ13 | | | | | | | | | | 1 | | 1 | | | 2 | | | | | | | | | | | | | | | | |
| FTGZ15 | 1 | 1 | | 2 | | | | 2 | | | 5 | 3 | | 3 | 7 | | | | | | | | | | | | | | | | |
| FTGZ16 | | 1 | | 1 | | 3 | | 1 | 2 | 1 | 3 | 1 | | | 2 | | | | | | | | | | | | | | | | |
| FTGZ17 | | | | | | | | | | | | | | | | | | | | | | | | | | | | | | | |

Fig-2B

METHOD OF ANALYZING AND OPTIMIZING A MULTISTAGE MANUFACTURING PROCESS

This application claims priority upon German Patent Application 199 49 954 3, filed on Oct. 16, 1999.

TECHNICAL FIELD

The present invention relates to a method for analyzing and optimizing a multistage manufacturing process, in which, in order to achieve predefined product properties, tuning steps are carried out, their type, number and extent being variable.

BACKGROUND OF THE INVENTION

Methods of the type mentioned at the beginning occur in various sectors of industrial production. Examples which may be mentioned are the chemical industry, the foodstuffs industry, steel manufacture, the manufacture of pharmaceuticals, mechanical engineering or automobile construction. In these sectors, "batch-mode" processes occur again and again, in which, in order to produce a product, a "standard parts list" of constant manufacturing steps is worked through and, following this, a variable sequence of tuning steps is further carried out in order to set one or more product properties to a predefined value or a value desired by the customer.

A multistage manufacturing process of the type mentioned is present in particular in the manufacturing of chemical products from mixtures of substances. Examples of this are foodstuffs, ointments or coatings. In this case, because of fluctuating properties of the starting products or specific requirements on the final product, after the standard recipe has been worked through, there is often a product from the manufacturing process which is still inadequate in terms of the desired product property. For this reason, small quantities of different additives are subsequently added in individual steps. In the case of coatings, these are, for example, toning pastes, water, rheological aids and other additives. It is not unusual for twenty or more additives per batch to have to be used for the manufacture of a coating, in order to obtain products in accordance with a specification. In addition to the desired properties of a chemical product, in particular of a coating, the pH value, the density, the color locus or the viscosity can be included in addition to the color.

In the manufacture of other products, correspondingly different properties may be the objective of the tuning. For example, in the manufacture of electronic circuits, these may be specific electrical properties, it being possible for the tuning steps in the manufacture of the circuit to consist in altering electrical parameters.

The tuning steps necessary to achieve predefined product properties make the manufacturing process more expensive and more complicated, so that in principle it would be desirable to mange with the smallest possible number of these.

SUMMARY OF THE INVENTION

The object of the present invention is therefore to provide a method which permits the analysis and optimization of multistage manufacturing processes of the type mentioned in the background.

BRIEF DESCRIPTION OF THE DRAWINGS

The advantages of the present invention will be readily appreciated as the same becomes better understood by reference to the following detailed description when considered in connection with the accompanying drawings wherein:

FIG. 1 is a screen display of a table for one color production in accordance with the preferred embodiment of the subject invention;

FIG. 2A is a table clarifying the method of the subject invention;

FIG. 2B is another table clarifying the method of the subject invention; and

DETAILED DESCRIPTION OF THE DRAWINGS

Figure 3:
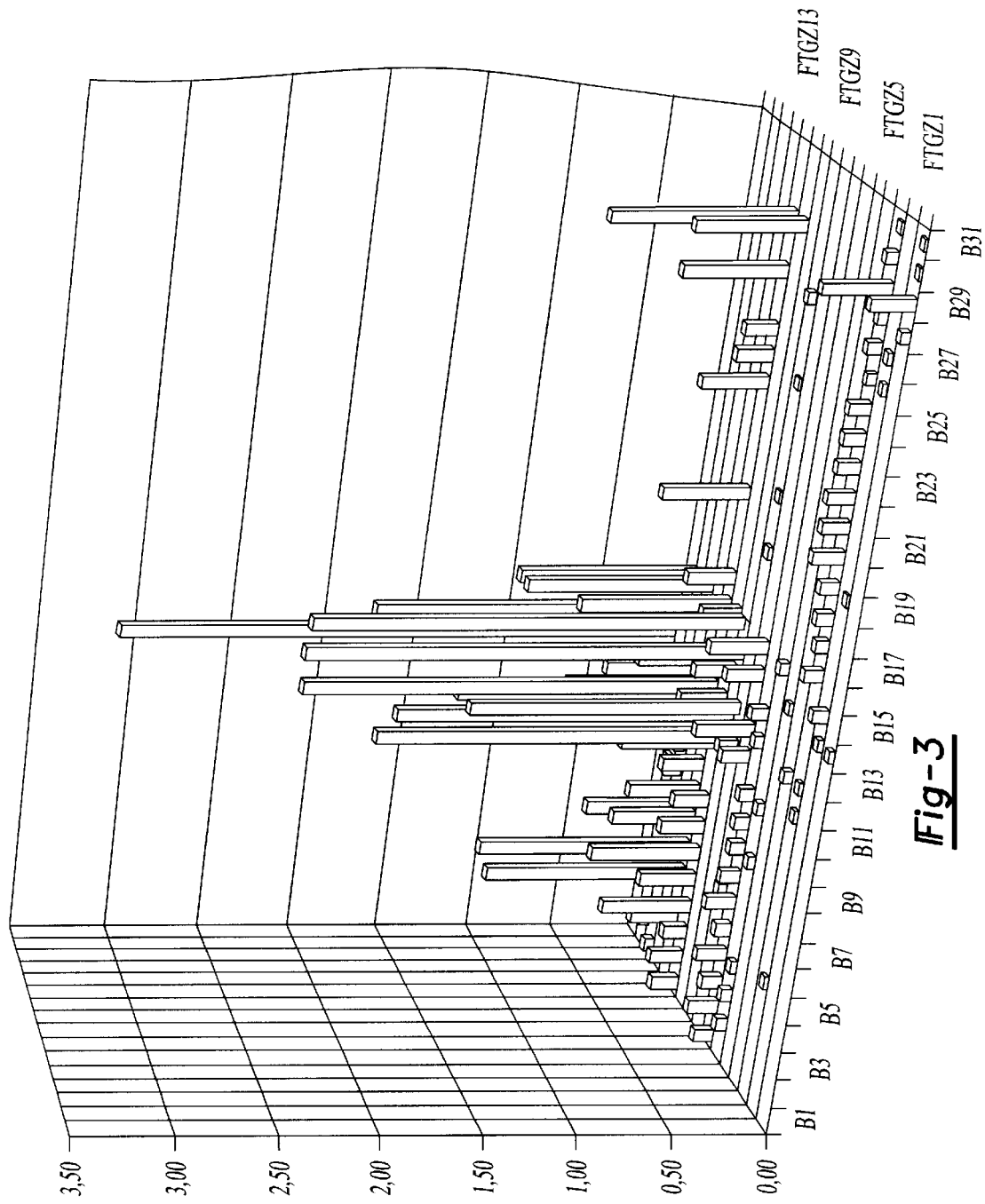
FIG. 3 is a three-dimensional graph for optimizing the data of FIGS. 2A and 2B.

The object of the invention is achieved by a method of analyzing a multistage manufacturing process, in which, in order to achieve predefined product properties, tuning steps are carried out, their type, number and extent being variable. In this case it is in particular the type the number and the extent of the tuning steps which are variable Their selection or definition is generally carried out in an iterative process, in which the desired product property is repeatedly remeasured and an approach to the desired value is attempted by means of a further tuning step. Appending the tuning steps to working through the standard parts list is often necessary since, because of fluctuating properties of the components in the standards parts list, the product property which is established cannot be predicted exactly. According to the invention, the analysis method is defined by all the individual steps of the manufacturing process, that is to say the standard steps and the tuning steps, which relate to at least one production-specific property of the steps are recorded quantitatively in an electronic database.

Combining and logging the individual steps of the multistage manufacturing process, and characterizing them in relation to at least one quantitative property, means that data is compiled which implicitly contains important information about the manufacturing process which has been run through and about the product. This important technical information is made accessible for the optimization of the manufacturing process by means of the compilation of the data. Because of the complexity of typical manufacturing processes, this information can expediently be handled only by means of electronic data processing.

The information hidden in the aforementioned data can also go beyond the manufacturing process per se and, for example, can also contain statements relating to the preproducts used. If, for example, it becomes possible to see from the compiled data that specific additives or processes have to be carried out continually, then these can be entered, at least to some extent, as standard steps. Additives or reworking which occurs from time to time in a product-specific or product-group-specific way can give an indication of fluctuations in quality of preproducts or of fluctuations in the production process.

The property which is recorded according to the invention from an individual step of the manufacturing process can be its extent, its proportion of the costs, its effect on the product property to be achieved and/or its composition from sub-elements. The extent of an individual step can be, for example, the quantity, measured in kilograms, of a chemical additive. The proportion of the costs can include both material costs and processing costs. For example, when a chemical additive is added, not only do corresponding material costs arise, but also, to some extent, considerable production costs for weighing in and metering in the additive. The effect of an individual step with regard to the product property to be achieved is in many cases known, at least in terms of its trend. Recording this effect within the context of the database created according to the invention therefore permits, in a particularly efficient way, an analysis and possibly the optimization of the manufacturing process which is targeted on the product property.

Furthermore, specific individual steps can consist of a number of subelements, for example a chemical additive may be a mixture of a number of chemical compounds. The qualitative and quantitative knowledge of this composition permits an improved prediction of the resulting final product. In addition, it may be possible to replace a multiplicity of individual steps with regard to the composition of subelements that is achieved in sum by means of one or a few individual steps. In this way, for example in the manufacture of a coating, the greatest number of different products can manufactured from the fewest possible different raw materials.

In addition, the electronic database can contain information relating to the properties of the product resulting from a manufacturing process that has been carried out. This may include, in particular, product deficiencies discovered in the quality assurance at the manufacturer or reported by the customer. By recording this information and looking at it together with the individual steps of the manufacturing process, it is possible to find the causes of the quality deficiencies via appropriate correlations and to eliminate them in an optimized manufacturing process.

It is preferable if a number of runs through multistage manufacturing processes are logged and recorded in the electronic database. Since, as a rule, the manufacturing processes differ in terms of their composition from individual steps, the basic variations can be used to obtain important information about the relationship between the individual steps of the process and the result obtained. In this case, using the analysis method according to the invention, it is also possible for an analysis of manufacturing processes from earlier production to be carried out subsequently.

The data contained in the database latterly described can be plotted in a three-dimensional graph, in a conditioning process, in such a way that the various runs through are plotted on a first axis, the individual steps (if necessary suitably combined) are plotted on a second axis, and the number of individual steps or a similar item of information pertaining to the quantity of individual steps is plotted on a third axis. From such a graph, a correlation and/or accumulation of individual steps can be read off well visually, which permits the user then to make the desired simplification of the method.

The invention further relates to a method of optimizing a multistage manufacturing process, wherein, in the context of the manufacturing process, in order to achieve predefined product properties, tuning steps are carried out, their type, number and their extent being variable. The optimization method is defined by the fact that at least one run through the manufacturing process is logged in an electronic database in a method of the abovementioned type, and by the fact that a number of individual steps of the manufacturing process which have similar effects on the product property to be achieved are combined into a single individual step.

With the optimization method, it is therefore possible to reduce the number of individual steps of a complex, multistage manufacturing process. For obvious reasons, this is associated with a saving in costs, which is to some extent considerable. The reduction in the individual steps is possible since these are combined whilst incorporating at least one quantitative criterion, and thus individual steps having identical effects on the desired product property can be detected.

Alternatively, a method of optimizing a multistage manufacturing process of the abovementioned type can be defined by the fact that at least two runs through the manufacturing process are logged in an electronic database in accordance with an analysis method described above, and by the fact that individual steps which are correlated in terms of occurrence and extent are combined into a single individual step. Accordingly, if it becomes possible to see, from the logged data from a number of manufacturing processes, that carrying out an individual step A generally entails carrying out an individual step B, then the two can either be replaced by a new individual step C=A+B, or, following individual analysis, can be replaced by a different individual step C', or the individual step can even be removed without replacement.

In the following text, the invention will be presented by way of example using the analysis and optimization of a formulation for the manufacture of a coating.

The individual steps of this manufacturing process generally comprise the addition of a specific material component. The listing of the individual steps therefore essentially corresponds to a parts list of these chemical components. In addition, however, if necessary, individual processing steps may also be included. The components of the parts list and the processing steps must be provided with a numbering system or some encoding of the working steps, or must be provided with a verbal description, so that each part and each processing step can be identified uniquely. At least one property of the starting material or of the processing step must follow from the designation system. This can be a chemical, physical or other technical property, for example solvent, solid, repair, combustible, color properties or connecting member.

The data is transferred into a schematic diagram which permits the user to draw conclusions relating to the optimization of the manufacturing process on the basis of a numerical or visual comparison of different batches.

Figure 1:
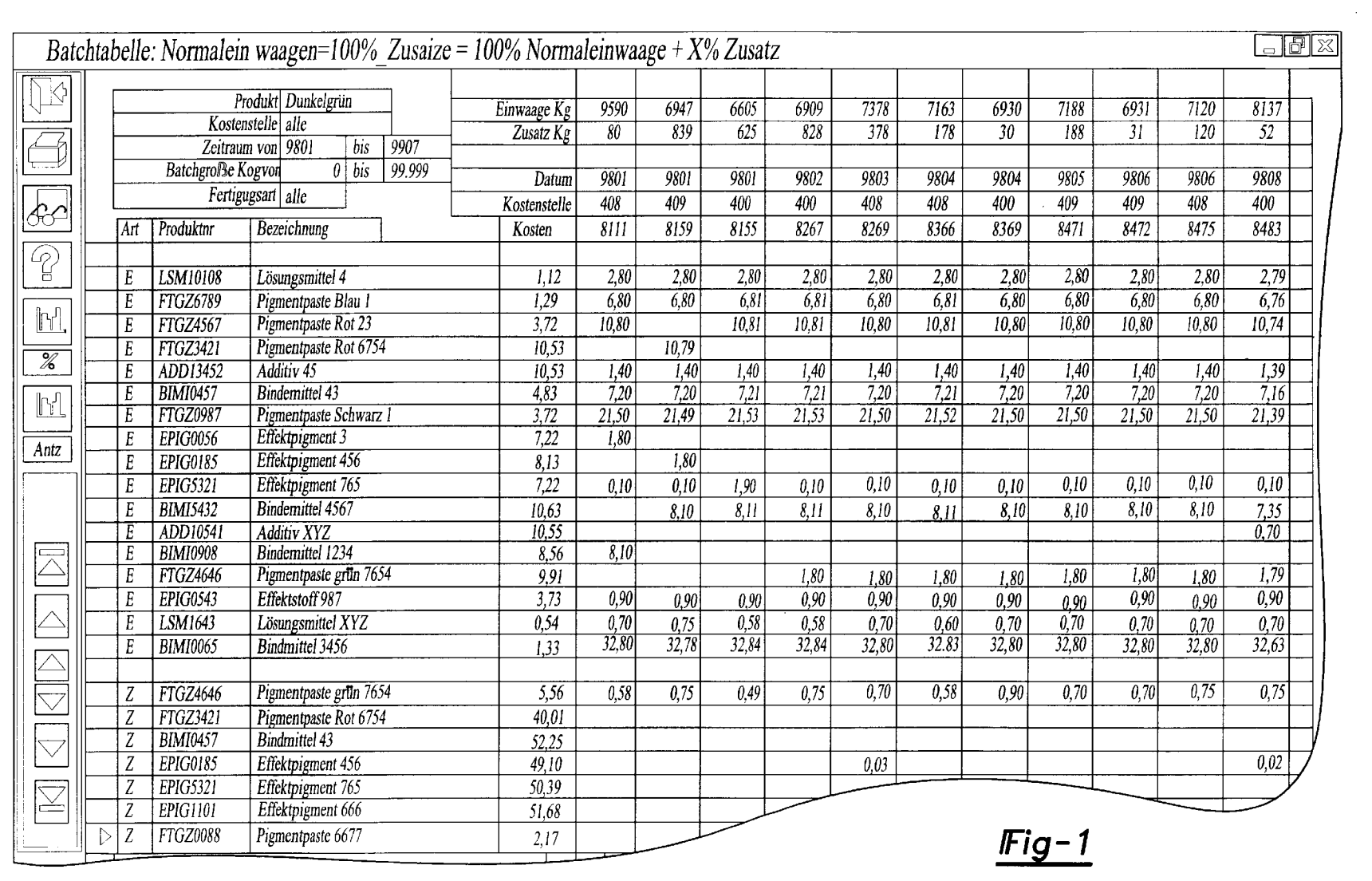

FIG. 1 illustrates the screen display of a table which, in its columns, reproduces a transformed parts list for one color production. The components of each batch are combined opposite a chronological parts list by the type of starting materials and the type of weighing. The chronological sequence of the addition has in this case been broken down for the benefit of a grouping in accordance with starting material properties (e.g. color) and a classification in accordance with the standard parts list and additive. In this case, the proportions in the standard parts list are identified in the first column by the letter E. The additives identified by the letter Z are primarily used to adjust the color.

FIGS 2A and 2B reproduce two tables, which are intended to clarify the method according to the invention. The table lines correspond to coloring additives, which are generally referred to as FTGZ1 to FTGZ17. The columns of the tables are assigned to various batches B1 to B31, which were manufactured over a certain period. In the top Table 1 numerical values are entered into the cells, said values corresponding to the proportion of coloring additive added in percent by weight (as referred to the standard parts list). In the lower Table 2, at the corresponding points, the numbers of individual weighings per batch are entered. Multiple weighings of the same pastes or similar pastes (e.g. different pastes from a color space) lead to a high production expenditure. In this case, each individual weighing of an additive produces extra costs.

Batches B1 to B15 correspond to the relationships before an optimization. Batches B16 to B31 are those which result following optimization of the manufacturing process. It can be seen here that the colors could be manufactured with a considerably reduced number of additives.

FIG. 3 shows a three-dimensional graph for optimizing the parts list in accordance with FIGS. 2A and 2B In this case, various runs through the manufacturing process are listed on the x-axis in a chronological sequence, using their batch numbers B1 to B31. The individual additives are plotted on the z-axis in accordance with their product designations FTCZ1 to FTGZ17. Plotted on the y-axis is the proportion of the color additive added in percent by weight (referred to the standard parts list) for a specific additive from a specific batch. The illustration is limited to the coloring materials in the manufacture. In this case, additives with the same product number have been combined into a total number. FIG. 3 therefore corresponds to a graphical representation of Table 1 from FIG. 2A.

As far as batch number B15, the processes are not optimized. In the graph, this becomes striking as a result of the large number of high bars, which symbolize a high proportion of the corresponding added component. Following optimization, on the other hand, only small quantities of additives still have to be added, the number of weighing steps also having been reduced considerably and one or two weighing steps often being sufficient. In such a graph, the formation of clusters can easily be seen.

In a program for recording the data from the manufacturing process, the desired batches can be selected via restrictions (product numbers, properties, batch size, production site, type of production, etc.). By means of suitable software, the data can be analyzed from various points of view, for example:

linking the production data with data relating to quality deficiencies reported by the customer;

analysis of manufacturing costs, which can include both the personnel, the raw materials and the packaging;

component searches, for example via product numbers or trade names;

raw-materials analyses for a specific product over a specific time period, for example for the purposes of removing raw materials because of limited quantities;

cost-center analysis, in which the differentiation between product campaigns can be carried out in different time units in relation to cost centers, in order for example to establish who, where, what and when was produced for the first time;

raw-material related analysis of the aforementioned type in order to establish which raw materials have been added or have been dispensed with over a specific time period, and to draw up a new KPI;

cost analysis for the raw materials.

The files generated can in turn be linked with one another in order to discover new economic and technical relationships. In this case, an analysis can even be made retrospectively, if suitable data from preceding time periods is present.

What is claimed is:

1. A method of analyzing a multistage manufacturing process comprising individual steps in order to achieve predefined product properties, comprising;

carrying out tuning steps, the type, number and extent of said tuning steps being variable;

quantitatively recording in an electronic database the individual steps of the manufacturing process which relate to at least one production-specific property;

quantitatively recording form an individual step of the manufacturing process at least one of its extent, its proportion of the cost, its effect on the product property to be achieved and its composition from subelements;

logging at least two runs through the manufacturing process; and combining individual steps which are correlated in terms of occurrence and extent into a smaller number of individual steps.

2. The method of claim 1, wherein the electronic database contains information relating to detected product deficiencies.

3. The method of claim 1, wherein the database contains the logs of a number of runs through the multistage manufacturing process.

4. The method of claim 3, wherein the data contained in the database is plotted in a three-dimensional graph, die various runs through being plotted on a first axis, the individual steps being plotted on a second axis and the number of individual steps or a similar item of information pertaining to the quantity of individual steps being plotted on a third axis.

5. A method of claim 1, wherein a number of individual steps of the manufacturing process which have similar effects on the product property to be achieved are combined into a single individual step.

6. A method of analyzing a multistage manufacturing process comprising individual steps in order to achieve predefined product properties, comprising;

carrying out tuning steps, the type, number and extent of said tuning steps being variable;

quantitatively recording in an electronic database the individual steps of the manufacturing process which relate to at least one production-specific property;

quantitatively recording from an individual step of the manufacturing process at least one of its extent, its proportion of the costs, its effect on the product property to be achieved and its composition from subelements, wherein the database contains the logs of a number of runs through the multistage manufacturing process; and plotting the data contained in the database in a three-dimensional graph, the various runs being plotted on a first axis, the individual steps being plotted on a second axis and the number of individual steps or a similar item of information pertaining to the quantity of individual steps being plotted on a third axis.

7. The method of claim 6, wherein the electronic database contains information relating to detected product deficiencies.

8. The method of claim 6, wherein a number of individual steps of the manufacturing process which have similar effects on the product property to be achieved are combined into a single individual step.

9. The method of claim 6, wherein individual steps which are correlated in terms of occurrence and extent are combined into a smaller number of individual steps.

* * * * *